(12) United States Patent
Motegi et al.

(10) Patent No.: US 7,903,630 B2
(45) Date of Patent: Mar. 8, 2011

(54) DATA TRANSMISSION SYSTEM, DATA TRANSMISSION METHOD, AND BASE STATION USED THEREIN

(75) Inventors: Masayuki Motegi, Yokohama (JP); Yasuhiro Kato, Yokohama (JP); Minami Ishii, Yokohama (JP); Takehiro Nakamura, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 176 days.

(21) Appl. No.: 12/065,500

(22) PCT Filed: Aug. 25, 2006

(86) PCT No.: PCT/JP2006/316680
§ 371 (c)(1),
(2), (4) Date: Aug. 4, 2008

(87) PCT Pub. No.: WO2007/029518
PCT Pub. Date: Mar. 15, 2007

(65) Prior Publication Data
US 2009/0154592 A1 Jun. 18, 2009

(30) Foreign Application Priority Data
Sep. 1, 2005 (JP) .................. 2005-253531

(51) Int. Cl.
*H04B 7/212* (2006.01)
(52) U.S. Cl. .......... 370/347; 370/335; 370/342; 370/336
(58) Field of Classification Search .................. 370/347, 370/335, 342, 336, 351, 259; 455/414.1, 455/412.1, 432.1, 450, 560, 502, 457, 451, 455/452.1
See application file for complete search history.

(56) References Cited

U.S. PATENT DOCUMENTS 7,209,762 B2 * 4/2007 Matsumoto et al. .......... 455/517
7,283,508 B2 * 10/2007 Choi et al. .................... 370/341
7,450,933 B2 * 11/2008 Kwak et al. ................ 455/414.1
(Continued)

FOREIGN PATENT DOCUMENTS
JP         2001-308856        11/2001
(Continued)

OTHER PUBLICATIONS

Taiwanese Office Action for Application No. 95131748, mailed on Nov. 19, 2009 (13 pages). International Search Report (Japanese and English) for PCT/JP2006/316680 mailed Nov. 14, 2006 (9 pages).

(Continued)

*Primary Examiner* — Ayaz R Sheikh
*Assistant Examiner* — Chuong T Ho
(74) *Attorney, Agent, or Firm* — Osha • Liang LLP

(57) ABSTRACT

A base station used in a packet transmission system in which shared user data to be selectively received by a user are transmitted using a shared data channel from one or more base stations to one or more mobile stations is provided. The base station includes means configured to provide user control data associated with transmission of the shared user data; means configured to provide notification data that include notification information used to select the shared user data and group identification information for specifying the notification information; and means configured to generate an associated control channel that is associated with the shared data channel and includes the user control data and the notification data, the associated control channel and the shared data channel being transmitted from the base station to the mobile station. The generated associated control channel is transmitted from the base station to the mobile stations.

13 Claims, 11 Drawing Sheets

U.S. PATENT DOCUMENTS

| | | | |
|---|---|---|---|
| 7,558,228 B2 * | 7/2009 | Lee et al. ............ 370/312 |
| 2002/0106985 A1 | 8/2002 | Sato et al. |
| 2003/0228865 A1 | 12/2003 | Terry |
| 2004/0087320 A1 | 5/2004 | Kim et al. |
| 2004/0152476 A1 | 8/2004 | Kuwano et al. |
| 2005/0101351 A1 * | 5/2005 | Lee et al. ............ 455/558 |
| 2005/0105494 A1 * | 5/2005 | Kim et al. ............ 370/335 |
| 2010/0014450 A1 * | 1/2010 | Chun et al. ............ 370/312 |

FOREIGN PATENT DOCUMENTS

| | | |
|---|---|---|
| JP | 2004-135293 | 4/2004 |
| JP | 2004-221759 A | 8/2004 |
| JP | 2005-524364 | 8/2005 |
| JP | 2006-5011705 | 1/2006 |
| WO | WO 2006131131 A1 * | 12/2006 |

OTHER PUBLICATIONS

Written Opinion of International Searching Authority (Japanese) (mailed Nov. 14, 2006 4 pages).

GPP TS 25.211 V6.5.00 Jun. 2005 "Phsical Channels and Mapping of Transport Channels onto Physical Channels (FDD)".

GPP TS 25.346 V6.5.00 Jun. 2005 "Introduction of the Multimedia Broadcast Multicast Service (MBMS) in the Radio Access Network (RAN)".

* cited by examiner

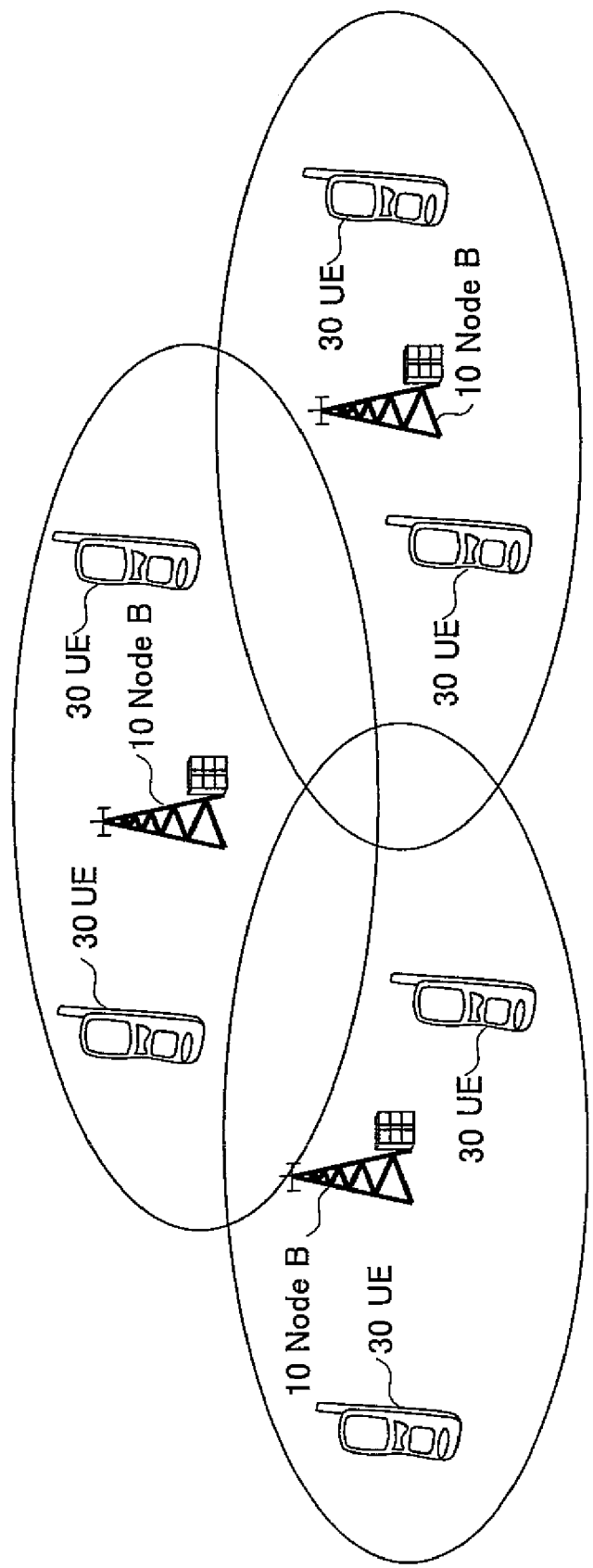

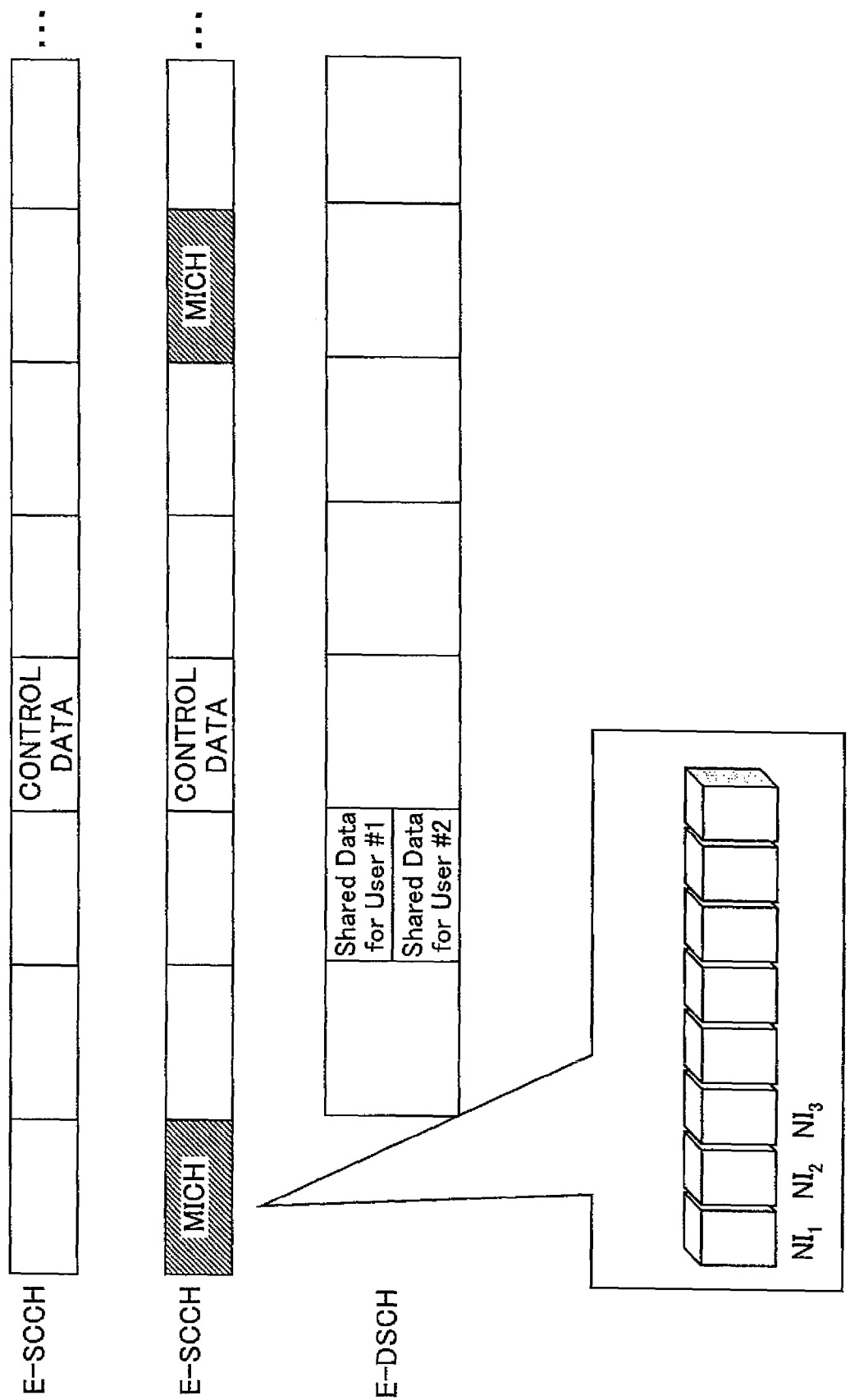

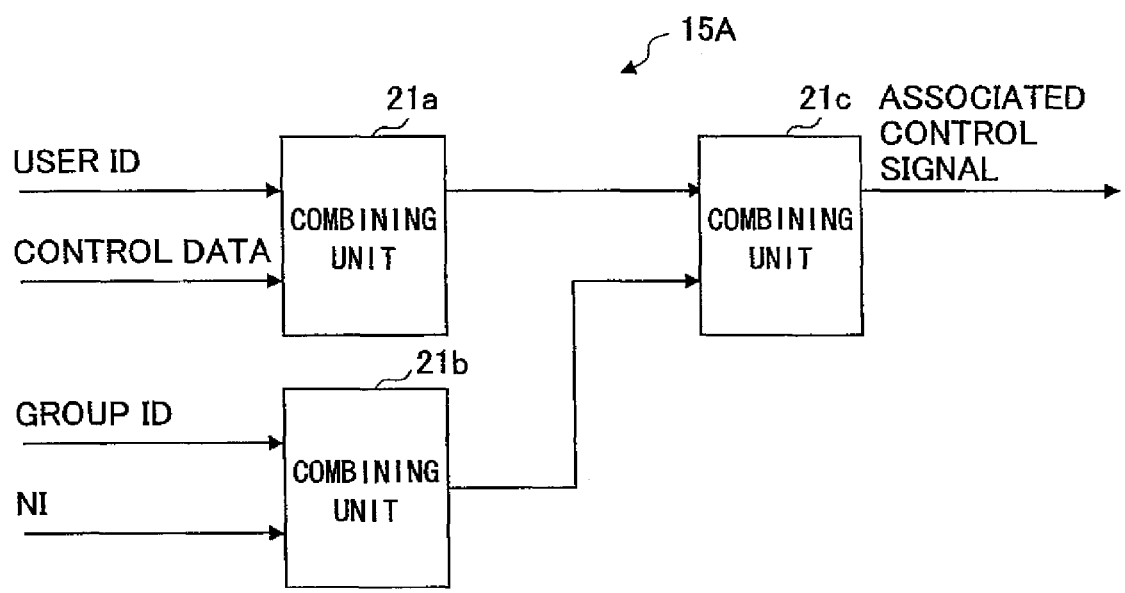

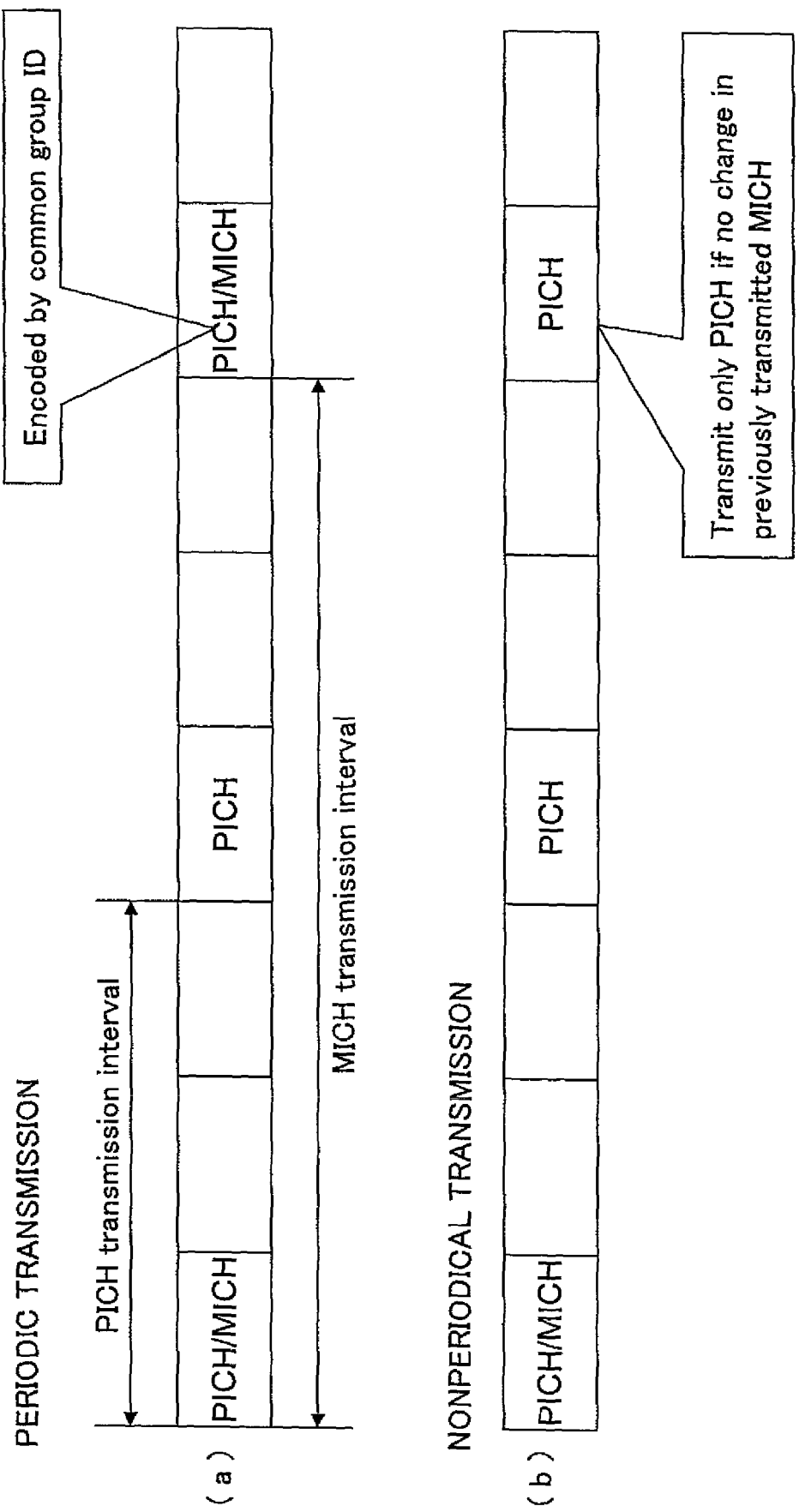

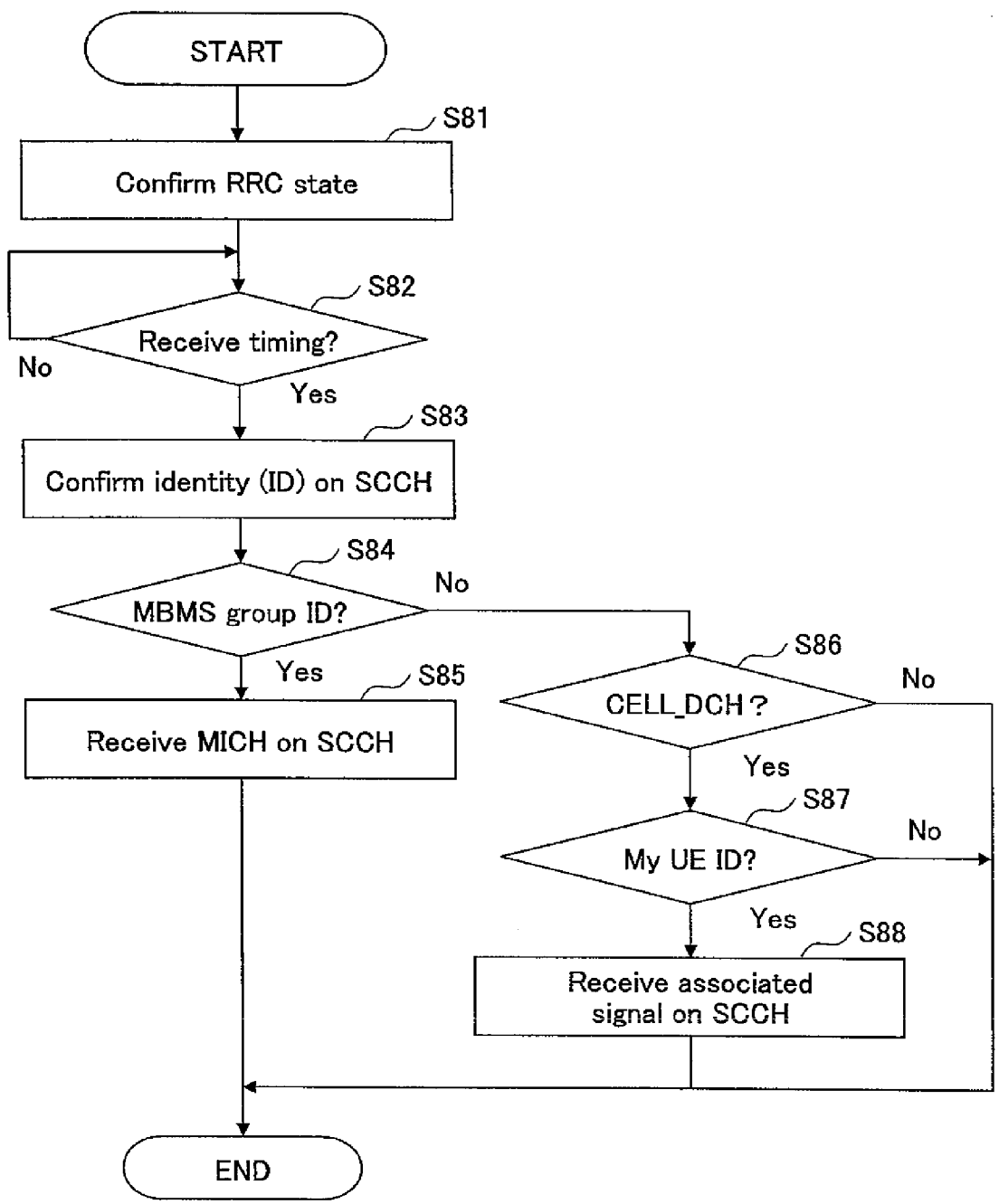

DATA TRANSMISSION SYSTEM, DATA TRANSMISSION METHOD, AND BASE STATION USED THEREIN

TECHNOLOGICAL FIELD

The present invention relates to a data transmission system, a data transmission method, and a base station that advertise multimedia broadcast/multicast services (MBMS) to mobile stations or user equipment capable of receiving MBMS user services.

BACKGROUND ART

In recent mobile communication systems, not only line switching voice services, but also high-capacity packet switching multimedia services are being provided. The 3rd Generation Partnership Project has visualized MBMS user services, and released the associated UTRAN architectures and channel structures. (See below-listed Non-Patent Publication 1.) A base station supplies an MBMS notification indicator (NI) to mobile stations to encourage the mobile stations to subscribe to MBMS user services. Each of the mobile stations can select a desired service (for example, multicast news) from the received notification indicator (NI), and reports the selection to the base station. Then, a service subscription procedure is executed.

In this arrangement, the notification indicator (NI) is periodically transmitted using a physical channel named MBMS indicator channel (MICH) to those mobile stations not in CELL_DCH state, which means that dedicated channels have not been established between the base station and those mobile stations. The transmission interval or timing is designated by the logical channel called a MCCH. The mobile station that received the NI also receives the MCCH (logical channel) mapped to the secondary common control physical channel (SCCPCH) corresponding to the received MICH. The content of the MBMS is defined by a logical channel, such as MCCH, MTCH, or MSCH, as is known in the art.

On the other hand, a dedicated notification indicator (DNI) is transmitted on DCCH, which is a downlink logical channel, to those mobile stations in CELL_DCH state with dedicated channels already established. The DCCH is mapped to a dedicated physical channel DPCH. The mobile station receives the dedicated notification indicator (DNI) on this physical channel, and then receives MCCH, MTCH, or other logical channels.

In accordance to the procedure, the mobile station can appropriately receive the MBMS notification indicator (NI) in either state as long as it is located in the MBMS service area.

With the above-described technique, the minimum necessary radio channels that have to be received at the mobile station or user equipment (UE) are defined corresponding to each of the UE states, other than CELL_DCH state. This minimum ability required for the mobile station is called "Minimum UE Capability".

To be more precise, the UE in CELL_PCH state or URA_PCH state has to have an ability to receive one PICH (physical channel) and one MICH (physical channel).

The UE in CELL_FACH state has to have an ability to receive one MICH (physical channel) and one SCCPCH (physical channel).

To the UE in CELL_PCH state, URA_PCH state, or IDLE state is periodically transmitted an MICH at a common transmission timing regardless of the radio resource control (RRC) state.

With the known method, the minimum UE capability is defined depending on the RRC state, and the radio channels that have to be received at the UE are determined in each of the states. Accordingly, the UE has to receive multiple radio channels simultaneously. This arrangement is undesired from the viewpoint of conserving battery power.

In addition, the types of radio channels received at the UE vary depending on the RRC states, and therefore, signal processing is likely to be complicated. For the mobile station in CELL_DCH state, a radio channel dedicated for a prescribed period of time may be used to transmit NI or other information. Concerning the mobile station in CELL_DCH state, the notification indicator (NI) or other information can be transmitted any time using a radio channel dedicated to that mobile station.

Meanwhile, in post-3G mobile communication systems, the data transmission scheme has been shifted from line switching to packet switching, and it is being studied and discussed how to transmit various logical channels using a single radio channel (e.g., an appropriately scheduled shared channel). Besides, the RRC states of UE are being simplified so as to be roughly classified into "ACTIVE" state and "IDLE" state, while CELL_FACH state is unlikely to be defined.

The "ACTIVE state" may then correspond to CELL_DCH state. It is being discussed to define "Dormant" as a sub-state of "ACTIVE". "Dormant" may then correspond to CELL_PCH state.

If the number of RRC states of UE is actually decreased and the types of radio channels to be transmitted are decreased or simplified, then issues arising from the viewpoint of battery power savings and computational workload may be reduced.

Because of the characteristics of the MBMS notification indicator (NI) that are announced to all the users to encourage service subscription, it is desired for the MBMS NI to be transmitted to all the users at or above a certain frequency. The mobile station (UE) in the IDLE state or "Dormant" state is not communicating traffic data; instead, it is in the discontinuous-receive mode for receiving information from the base station intermittently. Accordingly, it may not be difficult to announce the MBMS notification indicator (NI) at intervals intended by the network.

However, in the ACTIVE state, transmission of traffic data does not necessarily occur periodically, and packet scheduling varies depending on various items including quantity of traffic and channel conditions. If under such circumstances a notification indicator (NI) is transmitted periodically to all the mobile station or user equipment in a single uniform way, thereby forcibly occupying a resource of the shared data channel at certain intervals, then efficient use of radio resources of the shared data channel will be prevented. Furthermore, the content of the notification indicator (NI) may not change frequently depending on the situation. In this case, the efficient use of radio resources is further degraded.

NON-PATENT PUBLICATION 1: 3GPP Interface Standard, 3GPP "TS25.211" and "TS25.346"

SUMMARY OF INVENTION

Problem to be Solved

The invention was conceived to overcome at least one of the above-described problems, and a technological objective is to provide a packet data transmission system, a packet data transmission method, and a base station used therein which enable efficient announcement of an MBMS notification indicator to mobile stations in "ACTIVE" state.

Means for Solving the Problem

To solve the technological problem, in one aspect of an embodiment, a packet transmission system includes one or more base stations and one or more mobile stations, and shared user data selectively received by a user are transmitted from said one or more base stations to said one or more mobile stations using a shared data channel. The base station used in this system includes:

(a) means configured to provide user control data associated with transmission of said shared user data;
(b) means configured to provide notification data that include notification information used to select the shared user data and group identification information for specifying the notification information; and
(c) means configured to generate an associated control channel that is associated with the shared data channel and includes the user control data and the notification data, the associated control channel and the shared data channel being transmitted from the base station to the mobile station.

In one example, the base station used in the above-described packet transmission system creates the associated control channel by combining the user control data in which radio communication control information and user identification information are combined with the notification data in which the notification information and the group identification information are combined.

With this arrangement, the notification data, such as MBMS notification indicators, are efficiently transmitted to mobile stations without requiring channel transmission. It is unnecessary to simultaneously monitor multiple physical channels according to the RRC states of each of the mobile stations, and therefore, the testing step can be removed. In addition, the transmission repetition of the MBMS notification indicator (MBMS-NI) can be adjusted according to each of the RRC states, and the battery power savings effect can be improved.

In another example, the base station may time-multiplex the user control data and the notification data. In this arrangement, the notification data can be easily inserted into the associated control channel. The notification data may be inserted in the associated control channel in either a periodic or a non-periodic manner. This arrangement can avoid wasteful and repeated transmission of the notification data of the same content, and allow the radio resources to be released for other associated control channels.

In another example, paging information (or paging indicator PI) may be included in the associated control channel. In this case, the paging indicator may be periodically inserted in the associated control channel.

The paging indicator and the notification data may be time-multiplexed in the user control data at a constant interval.

ADVANTAGES OF INVENTION

The indicator for providing MBMS services can be efficiently communicated to the mobile stations operating in the ACTIVE state.

BRIEF DESCRIPTION OF DRAWINGS

FIG. 1 illustrates a communication system according to an embodiment of the invention.

FIG. 2 illustrates an example of a shared channel and the associated control channel containing MBMS-NI transmitted according to an embodiment of the invention.

FIG. 3B is a functional block diagram of an associated control signal generating unit.

FIG. 6B illustrates an example of transmission timing of PICH and MICH.

FIG. 8 is a flowchart of operations of the mobile station or the user equipment (UE) according to an embodiment of the invention.

LIST OF SYMBOLS

Figure 3A:
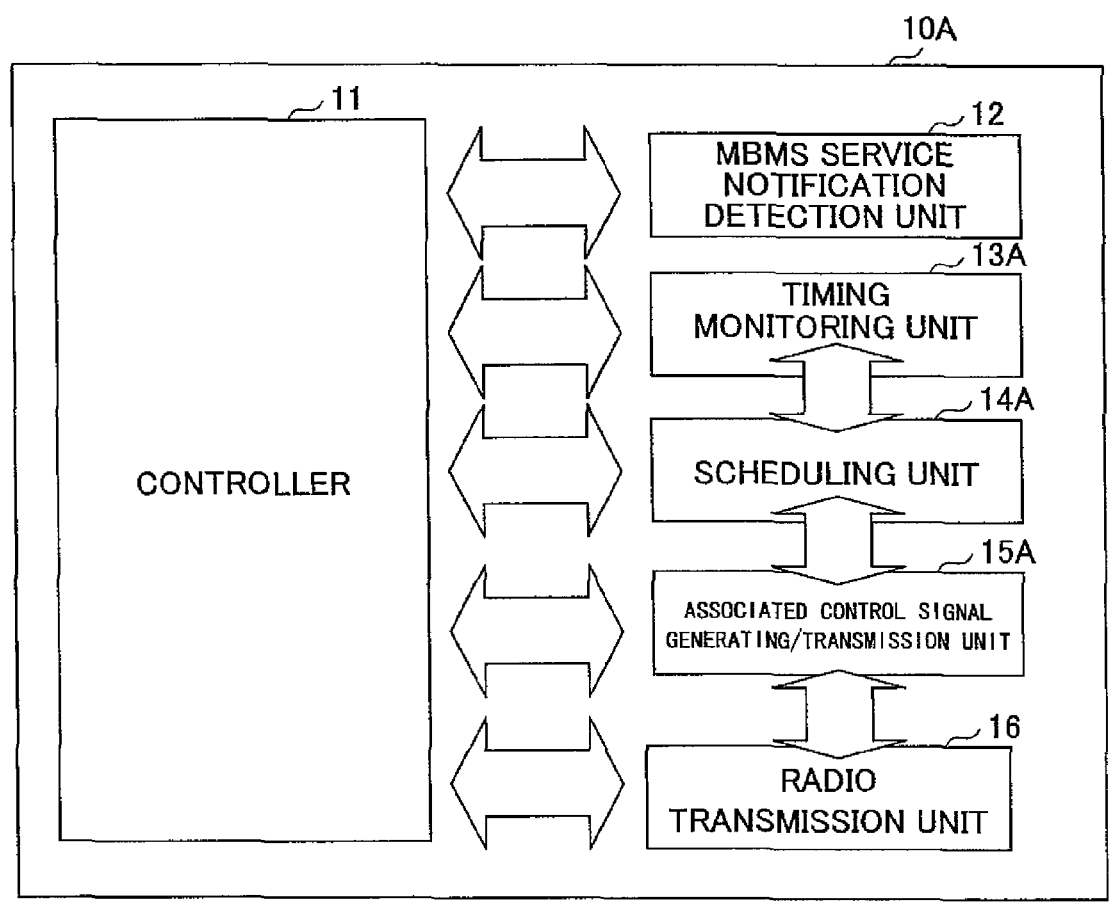
FIG. 3A is a functional block diagram of a base station according to an embodiment of the invention.

10: Base Station (Node B)
11: Controller
11*a*, 11*b*: Associated Control Channel Generating Unit
21*a*-21*e*: Combining Unit
30: Mobile Station or User Equipment (UE)
SCCPCH: Secondary Common Control Physical Channel
PICH: Paging Indicator Channel
DCCH: Dedicated Control Channel
DPCH: Dedicated Physical Channel
RNTI: Radio Network Temporary Identification

BEST MODE FOR IMPLEMENTING INVENTION

FIG. 1 illustrates a communication system, for example, a packet transmission system, according to an embodiment of the invention. The communication system structured by the embodiment includes multiple radio base stations (Node Bs) 10 and multiple mobile stations or user equipment (UE) 30. Each of the radio base stations 10 defines a cell, and a service area is formed by these cells in which radio signals are transmitted.

One of downlink channels transmitted from the radio base station 10 to UE 30 is a physical shared channel on which many logical channels including an MBMS logical channel (e.g., MTCH, MCCH, or MSCH) are transmitted. One or more associated control channels (E-SCCH: Enhanced-Shared Control Channels) are defined in association with the physical shared channel, and various types of associated control information can be transmitted on E-SCCH.

FIG. 2 illustrates an example of MCH transmission timing transmitted by E-SCCH visualized according to the embodiment. In FIG. 2, associated control channels (E-SCCH) shared among multiple users and a shared data channel (E-DSCH) are depicted. E-DSCH is a downlink shared channel for transmitting user data, and it is shared by user #1 and user #2 in this example. Although only two associated control channels are illustrated in the example shown in FIG. 2 for simplification purposes, three or more associated control channels may be provided depending on the number of users multiplexed in the shared data channel E-DSCH. It should be noted that it is unnecessary to allocate one associated control channel E-SCCH to each of the users because the mobile station in this embodiment is adapted to receive multiple E-SCCH.

On of the associated control channels E-SCCH includes an MBMS indicator channel (MICH) and control data associated with transmission of user data. The control data include, for example, information required to demodulate the shared data channel (such as a coding scheme, a modulation scheme, a spreading ratio, etc.). The content of the control data varies depending on the user, and the control data are identified by user identification information (User ID). A radio network temporary ID (RNTI) may be used as the user ID, or alternatively, an arbitrary identification parameter, such as IMSI, TMSI, or P-TMSI, may be used to identify the mobile station or the user equipment.

The MICH is inserted in the associated control channel (E-SCCH) at a predetermined interval or repetition rate. The repetition rate may be determined by the MCCH. In the MICH are contained notification indicators (NIs) for indicating services provided by the MBMS. In the example shown in FIG. 2, many notification indicators $NI_1$, $NI_2$, $NI_3$, ..., are contained in the MICH each corresponding to a particular content or service type.

Because, unlike control data for a specific user, the MICH is announced broadly to unspecified users in principle, it is desired for the MICH to be identified by certain group identification information items. However, user-specific service content for a specific user may be additionally announced by the MICH.

The MICH transmission timing may be either periodic or non-periodic. For example, if repeated transmission timing is designed, and if there is no change in the MICH transmitted at the previous transmission timing, then transmission of MICH at the next transmission timing may be skipped. This arrangement can avoid unnecessarily repeated transmission of MICH information, and the resource can be released and used for transmission of other information.

FIRST EMBODIMENT

FIG. 3A is a functional block diagram of a radio base station 10A used in the system shown in FIG. 1. The radio base station 10A includes a controller 11, a radio transmission unit 16, an associated control signal generating/transmission unit 15A, a scheduling unit 14A, a timing monitoring unit 13A, and an MBMS service notification detection unit 12.

The controller 11 carries out control on each of the entities of the radio base station 10A to regulate the overall operations of the radio base station 10A. The radio transmission unit 16 transmits the MICH using the associated control channel to announce the notification indicators of MBMS services to MBMS subscriber user equipment UE or potential user equipment to select and subscribe to an MBMS service. The associated control signal generating/transmission unit 15A generates and transmits an associated control signal in association with user data scheduled by the scheduling unit 14A. The scheduling unit 14A schedules data transmission so as to transmit the MBMS notification indicator (MBMS-NI) at designated transmission timing. When there is no change in the MBMS notification indicator, the scheduling unit 14A may allocates the resource to other control signals or allows user data to be transmitted using the shared channel. The timing monitoring unit 13A monitors the transmission timing designated by the notification of the MBMS. The MBMS service notification detection unit 12 determines if there is a new or updated MBMS service.

FIG. 3B is a schematic functional block diagram illustrating an example of the associated control signal generating/transmission unit 15A. In this example, user control data and the user ID are combined at the combining unit 21a, while notification indicator NI (with subfix i=1, 2, ... ) and the group ID are combined at the combining unit 21b. These combination signals are further combined at the combining unit 21c to generate the associated control signal. The signal combining is carried out by, for example, time multiplexing, but any other suitable multiplexing or combining method may be employed.

Figure 4:
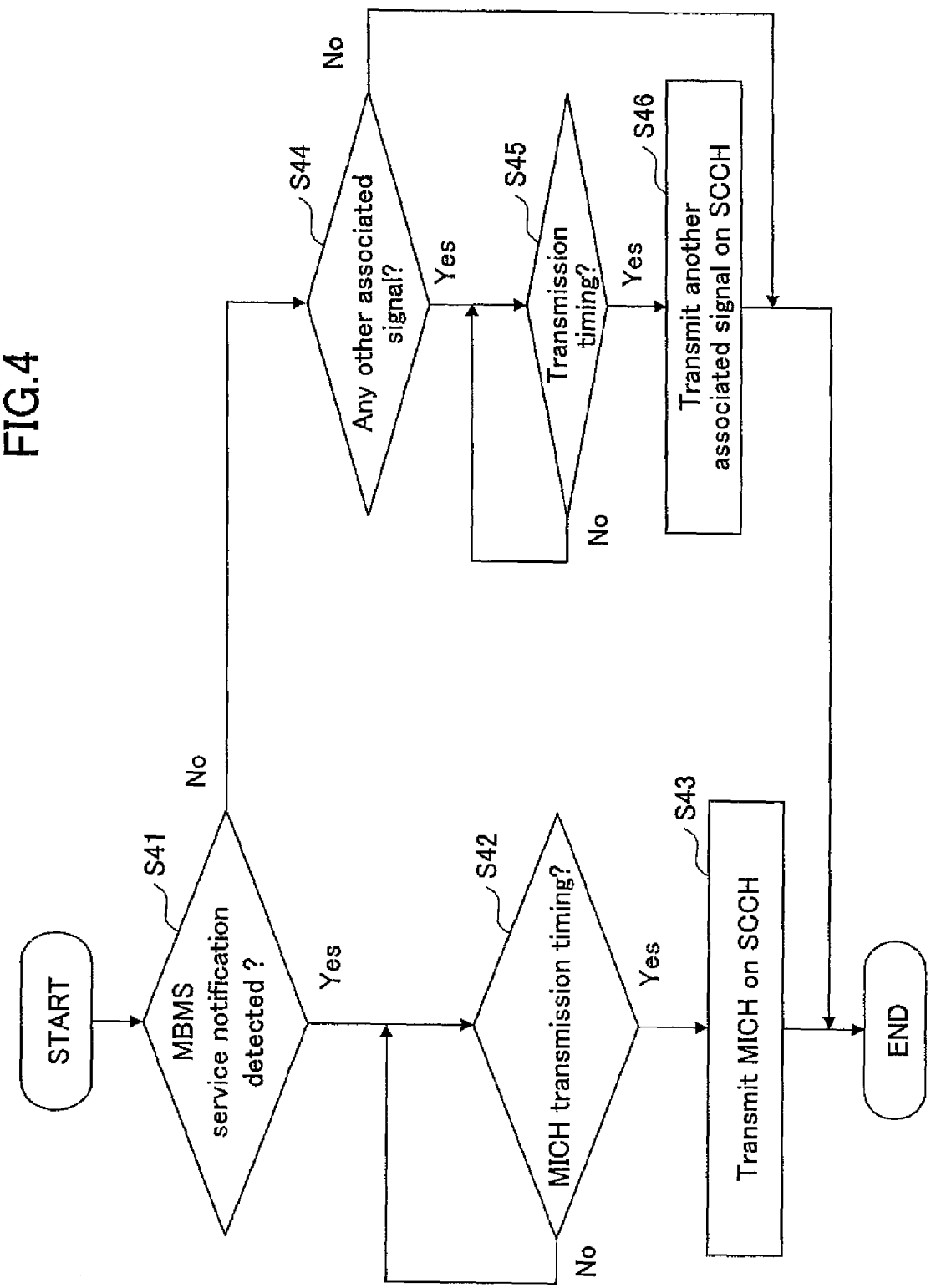
FIG. 4 is a flowchart of operations of the base station according to an embodiment of the invention.

FIG. 4 illustrates an operation flow of the radio base station (Node B) shown in FIG. 3A. First, it is determined at the MBMS service notification detection unit 12 whether there is a new or updated MBMS service notification (S41). If there is any MBMS service notification (YES In S41), it is confirmed at the timing monitoring unit 13A whether the current timing is the transmission timing of the MBMS service notification (S42). If the current timing is not the transmission timing of the MBMS service notification (NO in S42), the time is counted until the transmission timing. In this case, the content of the MBMS service notification is held until the transmission timing has come.

If the current timing is or reaches the transmission timing of the MBMS service notification (YES in S42), an MBMS notification indicator (NI) is transmitted on E-SCCH (S42). As described earlier, the notification indicator (NI) is encoded by the group ID, not by the user ID.

If in step S41 there is no newly created or updated MBMS service notification, then it is determined whether there is any other associated control signal to be transmitted using the SCCH (S44). If there is any other associated control signal to be transmitted, it is determined whether it is at transmission timing for the other associated control signal (S45). If at the transmission timing (YES in S45), the other associated control signal is transmitted (S46), and the operation flow terminates. The operation flow also terminates if there is no other associated control signal to be transmitted in the determination of step S44.

SECOND EMBODIMENT

Figure 5A:
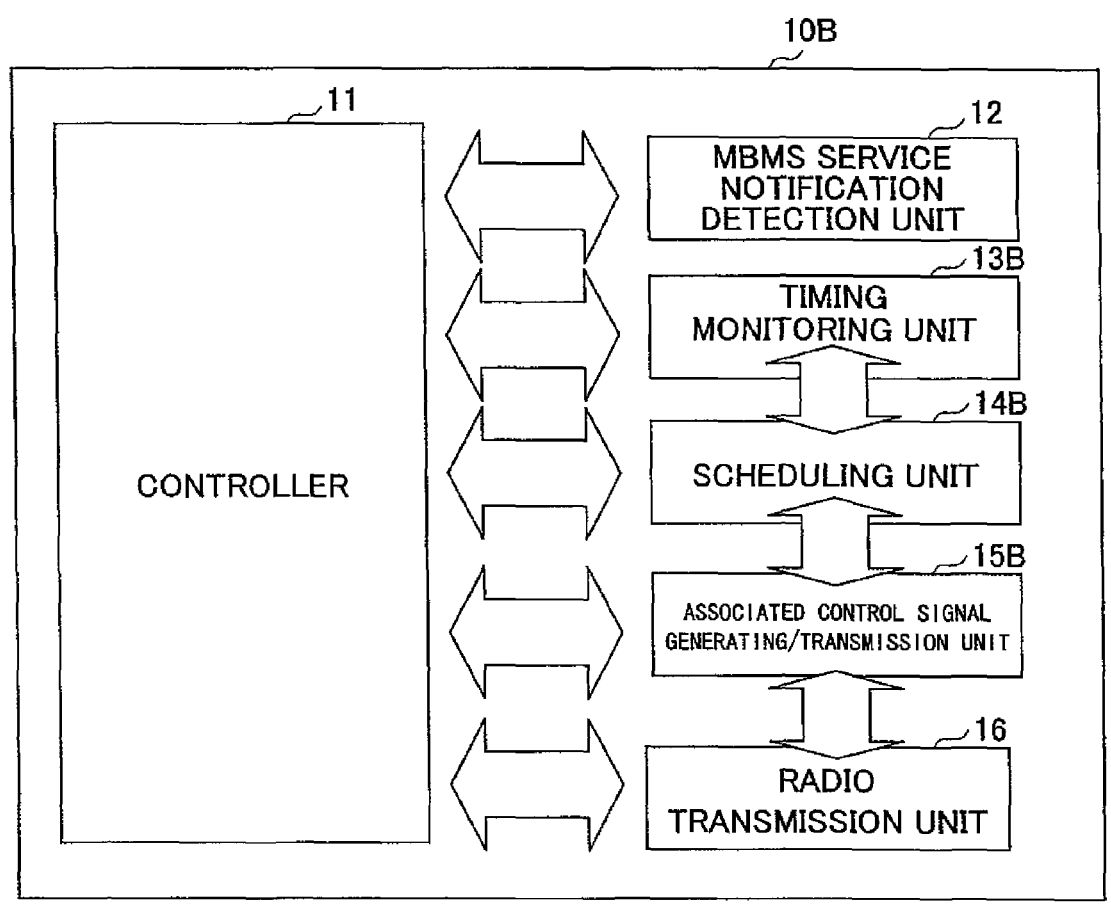
FIG. 5A is a functional block diagram of a base station according to another embodiment of the invention.

FIG. 5A is a functional block diagram of a radio base station (Node B) 10B according to the second embodiment of the invention. The radio base station 10B includes a controller 11, a radio transmission unit 16, an associated control signal generating/transmission unit 15B, a scheduling unit 14B, a timing monitoring unit 13B, and an MBMS service notification detection unit 12, as in the first embodiment, but it performs different functions and operations.

The controller 11 carries out control on the each of the functional entities of the radio base station 10B to regulate the overall operations thereof. The radio transmission unit 16 transmits an associated control channel (MICH) for providing notification of MBMS services to each of the user equipment UE currently subscribing to the MBMS services. In transmission of the MBMS notification indicator (MBMS-NI), the associated control signal generating/transmission unit 15B combines a paging indicator with the MBMS-NI and gives a common group ID at a paging indicator channel (PICH) transmission timing.

The scheduling unit 14B schedules the transmission of the MBMS notification indicator in accordance of the PICH transmission timing. If the current time is at PICH transmission timing and MICH transmission timing, and if there has been no change in the current MICH notification indicator since the last transmission timing; then the scheduling unit 14B withholds transmission of the MBMS notification indicator at the current timing, instead, it allows only transmission of the PICH. The timing monitoring unit 13B monitors paging information transmission timing, which is an additional function compared to the first embodiment. The timing monitoring unit 13B may also monitor the PICH transmission timing. It is unnecessary to time every PICH transmission, but several timings may be skipped during the monitoring of the PICH transmission timing. In this regard, the skip timing is designated in advance. Of course, the timing monitoring unit 13B may monitor every PICH transmission time. The MBMS service notification detection unit 12 determines whether there is a newly created or updated MBMS service notification.

Figure 5B:
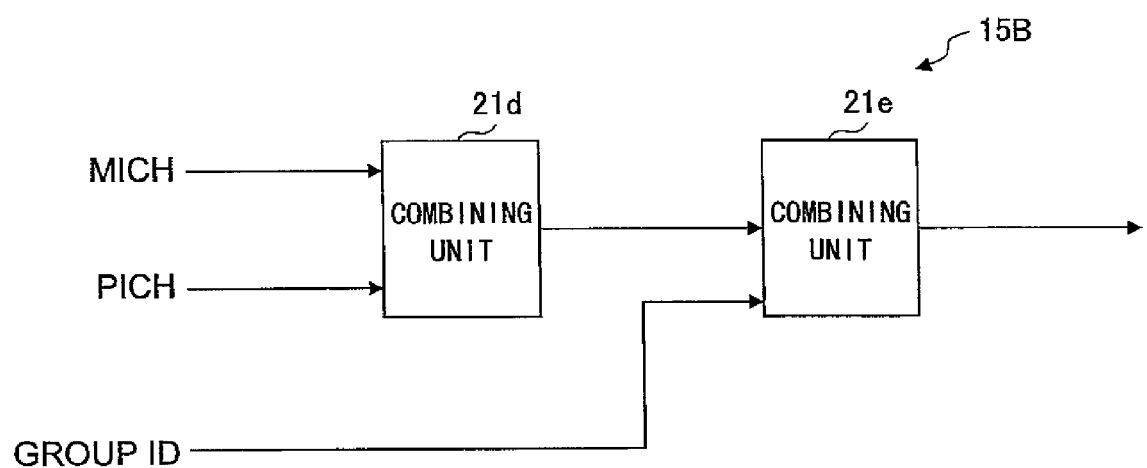
FIG. 5B is a functional block diagram of an associated control signal generating unit.

FIG. 5B is a functional block diagram illustrating an example of the associated control signal generating/transmission unit 15B. In this example, MICH and PICH are combined at the combining unit 21d, and a group ID is added to the combination of the MICH and the PICH at the combining unit 21e. The combining process may be carried out by time multiplexing, or any other suitable combining or multiplexing method may be used.

Figure 6A:
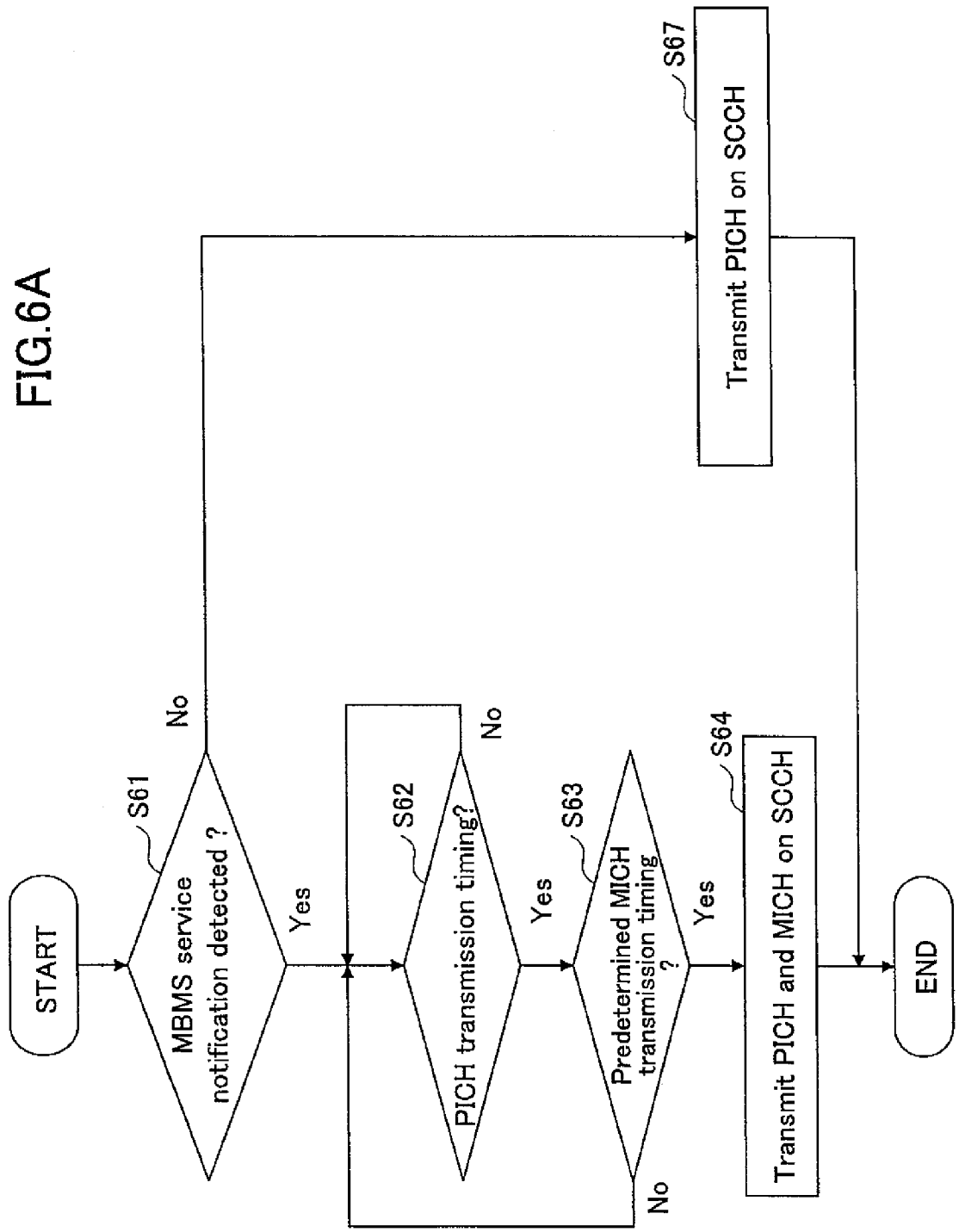
FIG. 6A is a flowchart of operations of the base station according to another embodiment of the invention.

FIG. 6A is an operation flow carried out by the radio base station (Node B) 10B of the second embodiment. First, it is determined at the MBMS service notification detection unit 12 if there is a newly created or updated MBMS service notification (S61). If there is any newly created or updated MBMS service notification (YES in S61), it is confirmed at the timing monitoring unit 13B whether current time is at PICH transmission timing (S62). If it is not at PICH transmission timing (NO in S62), the content of the detected MBMS service notification is held until PICH transmission timing has come. If it is at PICH transmission timing (YES in S62), it is further determined whether it is at a specific timing designated in advance (S63). If it is at the designated timing (YES in S63), then a MICH for transmitting the MBMS notification indicator and the PICH are combined at the associated control signal generating/transmission unit 15B, and a common group ID is given to generate an associated control channel. The associated control channel is transmitted on E-SCCH (S64), and the process terminates.

In the second embodiment, an MBMS notification indicator is transmitted in addition to PICH at a timing of the least common multiple of the PICH transmission interval and the MBMS notification transmission interval. When the MBMS notification indicator (MBMS-NI) is transmitted, it is encoded by the group ID, as in the first embodiment.

If it is determined as a result of the determination of step S61 that there is not a newly created or updated MBMS notification, only PICH is transmitted (S67) and the process terminates.

FIG. 6B illustrates examples of PICH and MICH transmission timing according to the embodiment. The MICH may be transmitted periodically, as illustrated in FIG. 6B(a), or alternately, it may be transmitted non-periodically as required, as illustrated in FIG. 6B(b).

THIRD EMBODIMENT

Figure 7:
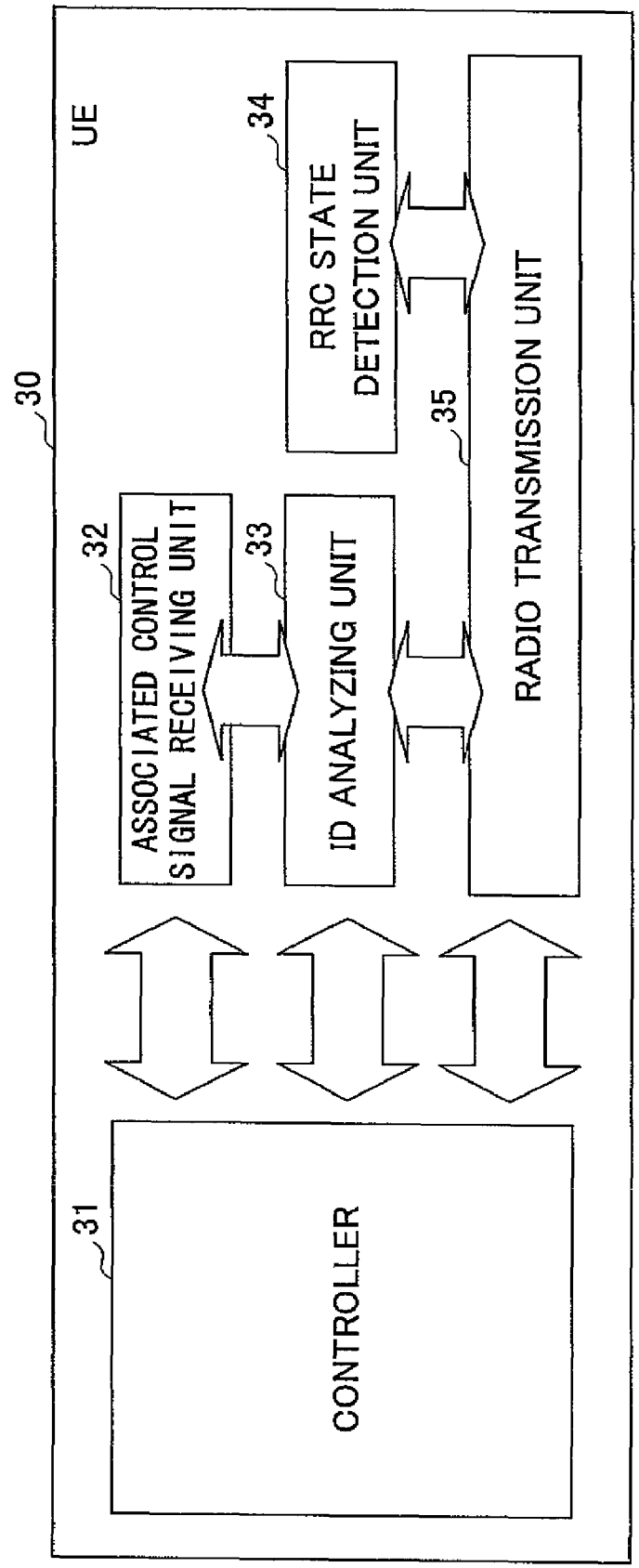
FIG. 7 is a functional block diagram of a mobile station or user equipment (UE) according to an embodiment of the invention.

FIG. 7 is a functional block diagram of a mobile station or user equipment (UE) 30 used in the system shown in FIG. 1, according to the third embodiment of the invention. The structure of the radio base station (Node B) 10 is the same as that illustrated in the first or second embodiment.

The mobile station or user equipment (UE) 30 includes a controller 31, a radio transmission unit 35, an ID analyzing unit 33, a associated control signal receiving unit 32, and an RRC state detection unit 34.

The controller performs control on each of the functional entities of the mobile station 30 to regulate the overall operations of the UE. The radio transmission unit 35 receives an associated control channel for announcing MBMS services to potential subscriber user equipment UE, and it receives a desired MBMS service once such an MBMS service is selected and subscribed to. The ID analyzing unit 33 identifies the identification information items provided by the radio base station (Node B) 10 to identify the associated control signal transmitted using the associated control channel. To be more precise, the ID analyzing unit 33 identifies the user ID for specifying the mobile station or user equipment 30, as well as the group ID specifying the MBMS notification indicator.

The associated control signal receiving unit 32 receives and modulates the control signal having been transmitted using the associated control channel according to the ID information analyzed by the ID analyzing unit 33. The RRC state detection unit 34 selects an MBMS service notification receiving interval according to the RRC state (such as CELL_PCH, IDLE, URA_PCH, etc.), and turns on the receiver of the mobile station (UE) at the selected timing. The receiving timing of each of the RRC states may be reported to the UE as broadcast information or by any other suitable means. In this example, the RRC state includes CELL_PCH, IDLE, and URA_PCH, but the invention is not limited to this example.

FIG. 8 is an operation flow of the mobile station or user equipment UE according to an embodiment of the invention. First, the RRC state of the UE is detected (S81). Then, it is determined by the UE whether the current time is at the MBMS notification receiving timing (S82). If at the MBMS notification receiving timing (YES in S82), a receiving operation for the associated control channel (SCCH) is started (S83). Upon reception of the SCCH, it is determined whether the packet identification contained in the received associated control channel is an MBMS group ID (S84). If the packet ID is the MBMS group ID, the MICH transmitted on the SCCH is received at the UE (S85). If the packet ID is not the MBMS group ID, it is determined by the UE whether the RRC state of the UE is CELL_DCH (S86). If in the CELL_DCH state (YES in S86), it is further determined whether the received packet ID is the unique identification (such as RNTI) of the UE (S87), If the packet ID is the unique identification (ID) of the UE, the associated control signal addressed to the UE and transmitted on the SCCH is received and modified by the UE (S88). Then, the process terminates. If it is determined as a result of the determination of step S82 that the current time is not at the MBMS notification receiving timing (NO in S82), then the receiver of the UE is turned off until the next receiving timing. The process also terminates when the determination results in step S86 or S87 is negative.

In this embodiment, the radio base station (Node B) transmits the MBMS notification indicator at transmission timing of either the IDL state, the PCH state, or the DCH state. The mobile station or user equipment UE may be adapted to receive the MBMS notification indicator in the DCH state or any other state.

This international application claims the benefit of the priority date of Japanese Patent Application No. 2005-253531 filed Sep. 1, 2005, and the entire content of which application is incorporated herein by reference.

The invention claimed is:

1. A packet transmission system including one or more base stations and one or more mobile stations, in which shared user data to be selectively received by a user are transmitted using a shared data channel from said one or more base station to said one or more mobile station, wherein the base station comprises:

means configured to provide user control data associated with transmission of the shared user data means configured to provide notification data that include notification information used to select the shared user data and group identification information for specifying the notification information, and means configured to generate an associated control channel that is associated with the shared data channel and includes the user control data and the notification data, the associated control channel and the shared data channel being transmitted from the base station to the mobile station, wherein the shared data channel and the associated control channel are transmitted from the base station to the mobile station, wherein the associated control channel generating means time-multiplexes the notification data, a paging control data, and the user control data, and wherein the user control data providing means includes:

a first combining unit configured to combine radio communication control information and user identification information to provide the user control data, a second combining unit configured to combine the notification information and the group identification information to provide the notification data, and a third combining unit configured to combine the user control data with the notification data to generate the associated control channel.

2. A base station used in a packet transmission system in which shared user data to be selectively received by a user are transmitted using a shared data channel from one or more base stations to one or more mobile stations, wherein the base station comprises:

means configured to provide user control data associated with transmission of the shared user data;

means configured to provide notification data that include notification information used to select the shared user data and group identification information for specifying the notification information; and means configured to generate an associated control channel that is associated with the shared data channel and includes the user control data and the notification data, the associated control channel and the shared data channel being transmitted from the base station to the mobile station, wherein the associated control channel generating means inserts paging control data in the associated control channel, wherein the associated control channel generating means time-multiplexes the notification data, the paging control data, and the user control data, and wherein the user control data providing means includes:

a first combining unit configured to combine radio communication control information and user identification information to provide the user control data, a second combining unit configured to combine the notification information and the group identification information to provide the notification data, and a third combining unit configured to combine the user control data with the notification data to generate the associated control channel.

3. The base station of claim 2, wherein the associated control channel generating means time-multiplexes the user control data and the notification data.

4. The base station of claim 3, wherein the associated control channel generating means periodically inserts the notification data in the associated control channel.

5. The base station of claim 2, wherein the associated control channel generating means inserts the paging control data periodically in the associated control channel.

6. A base station used in a packet transmission system in which shared user data to be selectively received by a user are transmitted using a shared data channel from one or more base stations to one or more mobile stations, wherein the base station comprises:

means configured to provide user control data associated with transmission of the shared user data;

means configured to provide notification data that include notification information used to select the shared user data and group identification information for specifying the notification information; and means configured to generate an associated control channel that is associated with the shared data channel and includes the user control data and the notification data, the associated control channel and the shared data channel being transmitted from the base station to the mobile station, wherein the user control data providing means includes:

a first combining unit configured to combine radio communication control information and user identification information to provide the user control data;

a second combining unit configured to combine the notification information and the group identification information to provide the notification data; and a third combining unit configured to combine the user control data with the notification data to generate the associated control channel.

7. The base station of claim 6, wherein the associated control channel generating means inserts paging control data in the associated control channel.

8. The base station of claim 7, wherein the associated control channel generating means inserts the paging control data periodically in the associated control channel.

9. The base station of claim 6, wherein the associated control channel generating means time-multiplexes the user control data and the notification data.

10. The base station of claim 9, wherein the associated control channel generating means periodically inserts the notification data in the associated control channel.

11. A packet data transmission method of transmitting shared user data using a shared data channel from one or more base stations to one or more mobile stations, the shared user data being selectively received by a user, the method comprising the steps of:

at the base station, providing user control data associated with the shared user data;

at the base station, providing notification data that contains notification information used to select the shared user data and group identification information for specifying the notification information;

at the base station, generating an associated control channel that includes the user control data and the notification data and is associated with the shared data channel; and transmitting the associated control channel together with the shared data channel from the base station to said one or more mobile stations, wherein generating the associated control channel includes time-multiplexing the notification data, the paging control data, and the user control data, and wherein the base station that provides the user control data includes:
a first combining unit configured to combine radio communication control information and user identification information to provide the user control data,
a second combining unit configured to combine the notification information and the group identification information to provide the notification data, and
a third combining unit configured to combine the user control data with the notification data to generate the associated control channel.

12. A packet transmission system including one or more base stations and one or more mobile stations, in which shared user data to be selectively received by a user are transmitted using a shared data channel from said one or more base station to said one or more mobile station,
wherein the base station comprises:
means configured to provide user control data associated with transmission of the shared user data,
means configured to provide notification data that include notification information used to select the shared user data and group identification information for specifying the notification information, and
means configured to generate an associated control channel that is associated with the shared data channel and includes the user control data and the notification data, the associated control channel and the shared data channel being transmitted from the base station to the mobile station,
wherein the shared data channel and the associated control channel are transmitted from the base station to the mobile station, and
wherein the user control data providing means includes:
a first combining unit configured to combine radio communication control information and user identification information to provide the user control data,
a second combining unit configured to combine the notification information and the group identification information to provide the notification data, and
a third combining unit configured to combine the user control data with the notification data to generate the associated control channel.

13. A packet data transmission method of transmitting shared user data using a shared data channel from one or more base stations to one or more mobile stations, the shared user data being selectively received by a user, the method comprising the steps of:
at the base station, providing user control data associated with the shared user data;
at the base station, providing notification data that contains notification information used to select the shared user data and group identification information for specifying the notification information;
at the base station, generating an associated control channel that includes the user control data and the notification data and is associated with the shared data channel; and
transmitting the associated control channel together with the shared data channel from the base station to said one or more mobile stations,
wherein providing the user control data includes:
combining, in a first combining unit of the base station, radio communication control information and user identification information to provide the user control data,
combining, in a second combining unit of the base station, the notification information and the group identification information to provide the notification data, and
combining, in a third combining unit of the base station, the user control data with the notification data to generate the associated control channel.

* * * * *